Sept. 22, 1970  M. R. KAUFMAN  3,530,315
JITTER-FREE TRIGGERING CIRCUIT
Filed March 15, 1968  3 Sheets-Sheet 1

MURLAN R. KAUFMAN
INVENTOR
BY
BUCKHORN, BLORE, KLARQUIST & SPARKMAN
ATTORNEYS

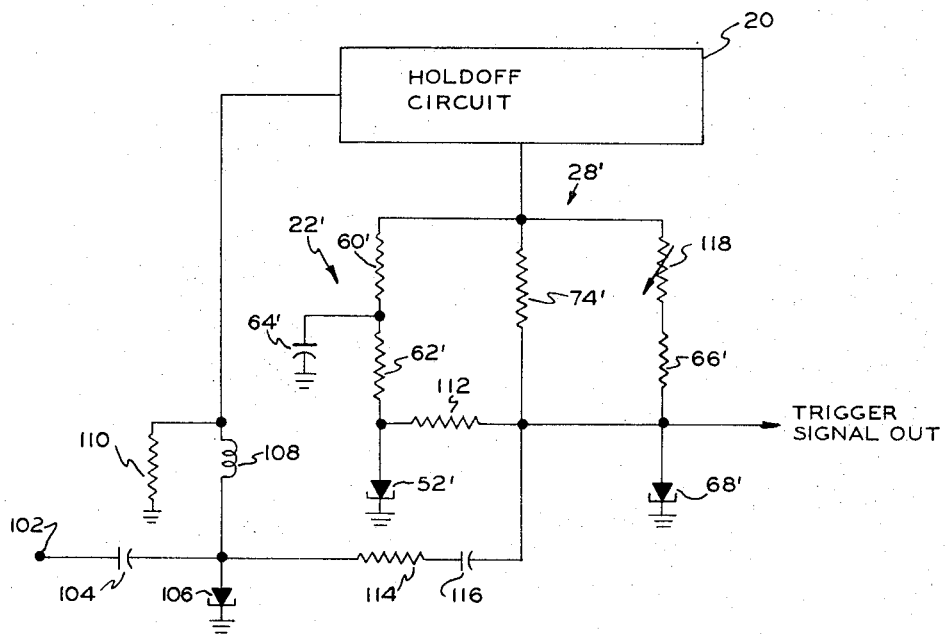
FIG 5 JITTER-FREE TRIGGERING CIRCUIT

United States Patent Office 3,530,315
Patented Sept. 22, 1970

3,530,315
JITTER-FREE TRIGGERING CIRCUIT
Murlan R. Kaufman, Portland, Oreg., assignor to Tektronix, Inc., Beaverton, Oreg., a corporation of Oregon
Filed Mar. 15, 1968, Ser. No. 713,451
Int. Cl. H03k *3/315*
U.S. Cl. 307—286                                                25 Claims

ABSTRACT OF THE DISCLOSURE

In a circuit for triggering an oscilloscope, an input triggering signal is detected by a first bistable device at the conclusion of a sweep holdoff period. Steering circuit means intercouples this first bistable device with a second bistable device whereby operation of the first device in response to detection of a triggering signal diverts current to the second in order to establish a triggering condition for the second. A delay means also couples the aforementioned triggering signal to the second bistable device, so that after the second bistable device is stabilized, the delayed triggering signal is supplied thereto and causes the second bistable device to provide an output.

BACKGROUND OF THE INVENTION

In an oscilloscope device for portraying a repetitive waveform, the term "jitter" refers to the movement of the portrayed waveform as triggering of horizontal deflection or the like is inaccurately accomplished. In many oscilloscope devices, for example, a triggering signal is derived from the repetitive input waveform for application to the device's sweep generator. This triggering signal causes the sweep generator to produce the horizontal time base, e.g., the movement of an electron beam from the left side to the right side of a cathode ray tube screen. The horizontal sweep is successively triggered in a correct relation to each repetition of an input waveform such that the portrayed waveform appears in substantially the same place on a cathode ray tube screen for each successive trace. However, if the sweep generator does not initiate its swep output for applciation to the horizontal deflection plate in accurately timed relation with successive triggering signals, jitter or movement of the portrayed waveform is likely to result.

After each sweep waveform is generated by a sweep generator, the sweep generator must recover before another sweep waveform is generated. For this purpose, the horizontal sweep system is appropiately provided with a holdoff circuit which disables the sweep generator until the latter is capable of providing an accurate sweep waveform. A holdoff signal is produced by the holdoff circuit and is conventionally used to inhibit the sweep generator. Both the holdoff signal and triggering signals may be applied to the sweep generator in an opposing sense. Then when the holdoff voltage declines sufficiently, a triggering signal may again initiate a horizontal sweep.

A principal source of jitter takes place if a triggering signal is received when the holdoff has almost, but not quite, recovered. As a result, the triggering signal may or may not cause the production of a sweep output at a desired time. Furthermore, since both the holdoff signal and the triggering signal are effectively applied as inputs to a sweep generator, different portions of a triggering signal may cause the initiation of a sweep output, depending upon the actual value of the holdoff signal that may be present at the time triggering is accomplished.

In the copending application of James H. Knapton and Henry A. Zimmerman, U.S. application Ser. No. 713,- 452, entitled, Jitter-Free Triggering Method and Apparatus, and assigned to the assignee of the present invention, a method and apparatus is disclosed for reducing jitter in a triggering operation, which might otherwise be occasioned at the end of a holdoff period. In the circuit therein disclosed and claimed, a first bistable means, which may comprise a tunnel diode, is employed to detect an input triggering signal. The first means is coupled through an amplifier to a second bistable means, which may comprise a tunnel diode, to thereupon establish a triggerable condition for the second bistable means. A delayed version of the same triggering signal is also applied to the second bistable means and triggers the second bistable means after a definite triggerable condition has been established therefor. The aforementioned circuit, while quite efficacious in eliminating triggering jitter, nevertheless has certain speed limitations occasioned by the delay in the amplifier coupling the bistable means. A conventional amplifier coupling means between tunnel diodes, for example, usually does not operate at a speed commensurate with the capabilities of tunnel diodes, and therefore extra delay occurs before the sweep begins. As a result, the first part of a triggering waveform may not be present in the oscilloscope presentation, or extra delay means must be added to the oscilloscope's vertical amplifiers. Such additional delay means may cause distortion in the waveform displayed.

SUMMARY OF THE INVENTION

According to the present invention the input triggering signal is detected in a first bistable circuit or device at the conclusion of the holdoff signal, and this device is employed to establish a triggerable condition for a second bistable circuit or device. Then, the triggering signal, preferably as delayed, is applied to the second bistable device for providing a triggering signal output. According to the present invention a current steering circuit is utilized for directly coupling the bistable devices. This steering circuit first provides a given current to the first bistable device, and as a consequence of detection in the first device, current is steered to the second bistable device for establishing a predetermined triggerable condition therefor. It has been found that the triggering level for the second device can then be established in approximately a nanosecond after the aforementioned detection, resulting in more rapid triggering and a shorter delay between occurrence of the input triggering signal and the initiation of another triggering output.

It is accordingly an object of the present invention to provide an improved and fast acting circuit for triggering oscilloscope operation substantially without the jitter which frequently occurs at the end of a holdoff period.

Another object of the present invention is to provide an improved fast acting trigger circuit for an oscilloscope or the like which is substantially automatic in its operation, over a wide frequency range, and which provides reliable, jitter-free triggering.

The subject matter which I regard as my invention is particularly pointed out and distinctly claimed in the concluding portion of this specification. The invention, however, both as to organization and method of operation together with further advantages and objects thereof, may best be understood by reference to the following description taken in connection with the accompanying drawings wherein like reference characters refer to like elements.

DRAWINGS

FIG. 5 is a schematic diagram of a second jitter-free triggering circuit according to the present invention.

DETAILED DESCRIPTION

Figure 1:
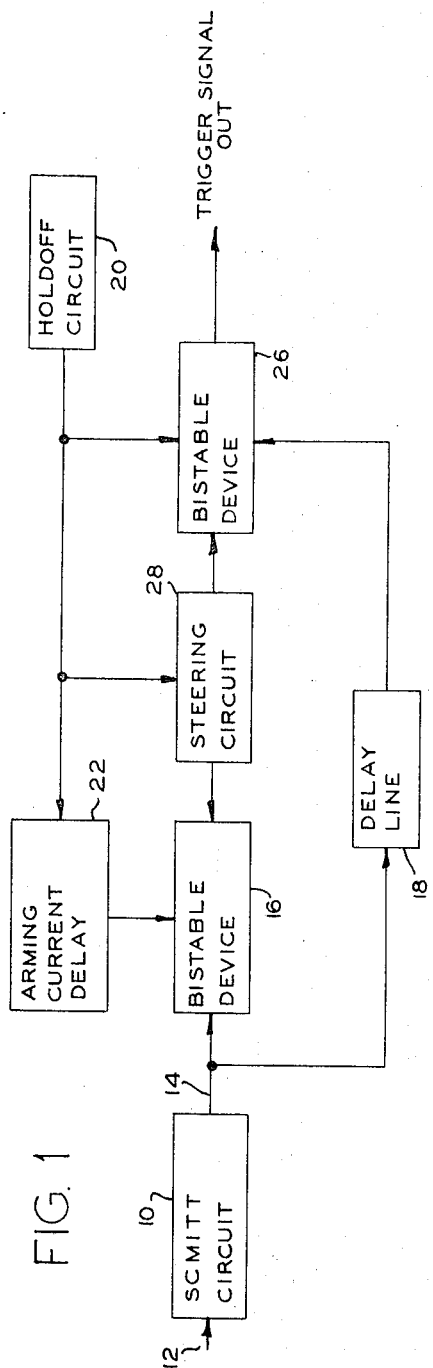
FIG. 1 is a block diagram of a jitter-free triggering circuit according to the present invention.

Referring to FIG. 1, a Schmitt circuit 10 receives input triggering signals at 12 and provides a shaped output at 14 for application to both first bistable device 16 and delay line 18. A holdoff circuit 20 also provides an input current to bistable device 16 through arming current delay 22, the holdoff circuit having been operated by an oscilloscope sweep generator or the like. Holdoff circuit 20 further provides an input current to second bistable device 26 as well as a source of current to steering circuit 28. Steering circuit 28, which substantially directly couples device 16 to device 26, alternately supplies such current to bistable device 16 or bistable device 26, according to the state and bias of these devices. The output of delay line 18 is applied to bistable device 26 for operating the same to provide a trigger signal output. The trigger signal output may initiate operation of an oscilloscope horizontal sweep ramp generator or a ramp circuit in a sampling oscilloscope. The circuit may alternatively drive a pulse generator or some other triggerable device.

Holdoff circuit 20 may be operated either by detecting a voltage which the output of a sweep generator will reach, or else the holdoff circuit may be operated at some other time, for instance by timing circuitry which causes holdoff circuit 20 to assume a different output state when the circuitry has recovered from a prior triggered operation. The holdoff circuit in the present example provides a holdoff signal which continues for the duration of a holdoff period, the latter equalling at least the recovery time of the circuitry.

The FIG. 1 circuit operates in the following manner. At the conclusion of the holdoff signal generated by holdoff circuit 20, current is supplied from the holdoff circuit to bistable device 16 through arming current delay 22, as well as to the steering circuit 28. The application of current to device 16 is delayed as a result of the presence of arming current delay 22. Holdoff circuit 20 supplies an initial current to bistable device 26, and steering circuit 28 initially provides its current to bistable device 16. The two currents supplied device 16 together render device 16 responsive to a triggering signal from Schmitt circuit 10, substantially at the end of a holdoff signal, that is substantially at or after the conclusion of the holdoff period, and after the delay of arming current delay 22.

Bistable device 26 represents means in which a triggerable condition is established for a ramp generator or other device to which the trigger signal output is applied. When bistable device 16 receives an input triggering signal from Schmitt circuit 10 at the conclusion of a holdoff period, it switches from a first stable state to a second stable state, causing the current supplied by steering circuit 28 to be shifted from bistable device 16 to bistable device 26. The current supplied directly from the holdoff circuit to bistable device 16 continues to flow to keep bistable device 16 in its second stable state. The shifted current, in addition to the current initially provided bistable device 26 from holdoff circuit 20, establishes a triggerable condition for bistable device 26 corresponding to a first state thereof.

Delay line 18 also receives the same input triggering signal from Schmitt circuit 10 and provides a delayed triggering output for application to bistable device 26. If bistable device 26 is now in triggerable condition, the device 26 is switched from a first stable state thereof to a second stable state for operating a device to which the trigger signal output is connected, e.g. a horizontal sweep circuit or the like of an oscilloscope. Since bistable device 26 has had time to reach a first stable state or a stabilized triggerable condition before the application of such delayed triggering signal via delay line 18, triggering is certain and timed correctly in the same relation to a triggering signal for each successive triggered operation.

The bistable device 16, which arms bistable device 26 at the end of the holdoff period, may be subject to differences in the time of operation from one triggered operation to the next. However, the delay of delay line 18 is arranged to be such that, in any case, the steering circuit 28 as operated by bistable device 16 will have switched current to bistable device 26 for establishing a stable triggering condition therefor in advance of the receipt of the delayed triggering signal from delay line 18. As a result, triggered operation of a driven device, e.g., the deflection means, occurs accurately and substantially without jitter.

The circuit according to the present invention, employing a current steering circuit between bistable devices 16 and 26, enables rapid arming of bistable device 26 by bistable device 16 so that the operating speed of the circuit is quite fast. The current switching in the current steering circuit can take place in about a nanosecond. The delay in delay line 18 is suitably several nanoseconds, for example, 5 nanoseconds, to insure that the triggerable condition of bistable device 26 is firmly established before the delayed triggering signal is applied thereto. In addition, arming current delay 22 is interposed between holdoff circuit 20 and bistable device 16 to insure that the current initially directly provided from holdoff circuit 20 to bistable device 26 is firmly established before bistable device 16 is rendered receptive to a triggering signal from Schmitt circuit 10.

The Schmitt circuit 10 is advantageously employed to provide a triggering output at 14 for a fairly wide range of inputs at 12. It is understood that various other circuits may be substituted therefor, for example, a multivibrator triggered by a triggering input signal. In the latter case, a holdoff signal from holdoff circuit 20 is also suitably provided to such multivibrator to inhibit operation thereof during the holdoff period.

Figure 2:
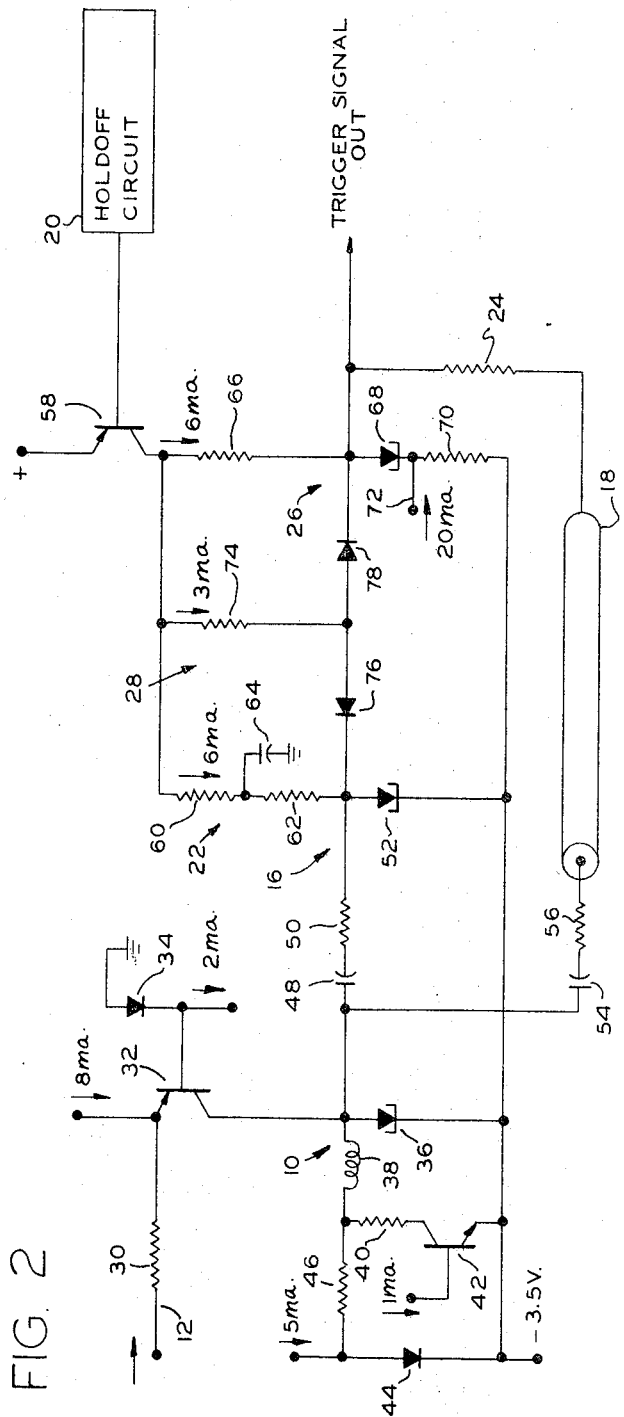
FIG. 2 is a schematic diagram of the same circuit.

Referring to the schematic diagram of FIG. 2 wherein like reference numerals refer to like elements, the input triggering signal is again received at 12 and is coupled through resistor 30 to the emitter of PNP transistor 32 to which a supply current is also delivered. The base of transistor 32 is also connected to a source of current and through diode 34 to ground. The cathode of diode 34 is connected to the base of transistor 32 and this diode is employed for maintaining the base of the transistor at a predetermined voltage level. Transistor 32 provides an isolation stage for the circuitry according to the present invention. The transistor stage configuration is essentially that of a common base amplifier, with the collector of transistor 32 being connected to the anode of a negative resistance device, e.g. tunnel diode 36.

Negative resistance device or tunnel diode 36 forms the principal component of Schmitt circuit 10 and is coupled between the collector of transistor 32 and a negative voltage point. An inductance 38 connects the anode of tunnel diode 36 to a shunting circuit comprising resistor 40 in series with the collector-emitter path of NPN transistor 42. The emitter of transistor 42 is connected to the cathode of tunnel diode 36, and the base of transistor 42 is connected to a source of current. The junction between inductance 38 and resistor 40 is coupled to the anode of a diode 44 by means of resistor 46, while the anode of diode 44 is also connected to a source of current, its cathode being returned to the cathode of tunnel diode 36.

Figure 3:
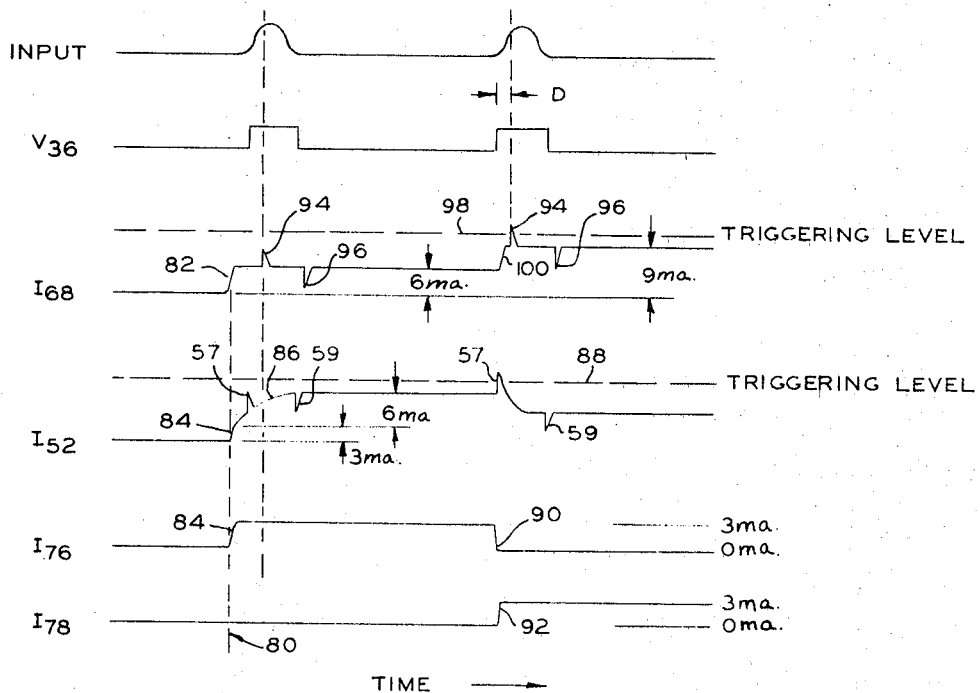
FIG. 3 is a first waveform chart illustrating operation of the present invention.

The circuit 10 including tunnel diode 36 operates in a manner of a Schmitt trigger wherein tunnel diode 36 normally resides in a low voltage state. When an input at 12 exceeds a first value, tunnel diode 36 switches to a second state, exhibiting a relatively high voltage thereacross as long as the input remains above such level. Then, when the input at 12 drops below a second and lower level, diode 36 returns to its low voltage condition. The circuit thus exhibits a hysteresis characteristic. This characteristic is narrowed by shunting the tunnel diode with a resistance here comprising transistor 42 in series with resistor 40. Moreover, transistor 42 is operative to present a first value of resistance when tunnel diode 36 is in its high voltage state, while exhibiting a higher value of resistance when the tunnel diode is in its low voltage state, whereby less initial triggering current is taken by transistor 42. The circuit including diode 44 is a temperature compensating circuit coupled essentially in parallel with the tunnel diode. The diode 44 draws a changing current with temperature in the manner similar to the action of tunnel diode 36 for compensating the same. The output voltage across diode 36 is illustrated in FIG. 3 as $V_{36}$.

The output of tunnel diode 36 is differentiated by a capacitor 48 and coupled from the anode of tunnel diode 36 via capacitor 48 in series with resistor 50 to the anode of another negative resistance device, e.g. tunnel diode 52, the cathode of which is returned to a negative voltage point. This negative resistance device or tunnel diode here comprises the bistable device 16. The output of tunnel diode 36 is also differentiated by means of capacitor 54 in series with resistor 56 coupling the anode of tunnel diode 36 to the input of delay line 18. Delay line 18 is suitably a 50 ohm coaxial line having a delay of approximately 5 nanoseconds, and its output is coupled to the anode of tunnel diode 68 through resistor 24. Differentiated pulses indicated at 57 and 59 in FIG. 3 are therefore substantially identically delivered to both tunnel diode 52 and delay line 18, coincident with the beginning and end of a voltage square wave across tunnel diode 36, indicated at $V_{36}$ in FIG. 3.

The output of holdoff circuit 20 is connected to the base of PNP transistor 58, the emitter of which is connected to a positive voltage. The collector of transistor 58 is coupled through a series connection comprising resistors 60 and 62 in that order between the collector of transistor 58 and the anode of tunnel diode 52, while a capacitor 64 is connected from the midpoint of the resistors to ground. Resistors 60 and 62 together with capacitor 64 form an arming current delay circuit 22.

The collector of transistor 58 is also coupled through resistor 66 to the anode of a negative resistance device, here comprising tunnel diode 68. Tunnel diode 68 in this circuit comprises the bistable device 26, and its cathode is returned to a negative voltage point through bias resistor 70.

A source of current is applied at 72 to flow through resistor 70 and thus provide a voltage drop biasing the cathode of tunnel diode 68 positive relative to the cathode of tunnel diode 52. The anode of tunnel diode 68 is also connected to the output of delay line 18, as well as to the trigger signal output.

Between tunnel diode 52 and tunnel diode 68 is located a current steering circuit 28 here comprising a resistor 74 coupled between the collector of transistor 58 and the anodes of Schottky barrier diodes 76 and 78. The cathode of diode 76 is connected to the anode of tunnel diode 52 while the cathode of diode 78 is connected to the anode of tunnel diode 68. During a given state of holdoff circuit 20, at the conclusion of a holdoff period, a current of approximately 6 milliamperes is provided at the collector of transistor 58 through resistors 60 and 62 to tunnel diode 52. Application of this current is delayed somewhat by the combination of resistors 60 and 62, and capacitor 64. Also, a similar amount of current, e.g. 6 milliamperes, is provided through resistor 66 to tunnel diode 68. In addition, a current of approximately 3 milliamperes is suitably provided through resistor 74 to the anodes of diodes 76 and 78. The latter current initially flows substantially entirely through tunnel diode 52, when the circuit is untriggered, since the cathode of tunnel diode 68 is biased by resistor 70, biasing the cathode of diode 78 such that the latter does not conduct. The foregoing current distribution takes place before the circuit is triggered.

Assume now that a prior trigger signal output has just been delivered, and holdoff circuit 20 is operated by a sweep generator or the like to provide a positive-going holdoff signal for a predetermined holdoff or circuit recovery period. The holdoff signal from holdoff circuit 20 during this period substantially cuts off transistor 58 so that the aforementioned currents through resistors 60 and 62, resistor 74, and resistor 66 are not provided. At the conclusion of the holdoff period, the holdoff signal from holdoff circuit 20 concludes, allowing transistor 58 to conduct and again provide these currents. It is understood that the values of currents given are by way of example only for purposes of illustrating the operation of the present invention. It is also understood that when a detection or some other function is spoken of as happening at the conclusion of a holdoff period or holdoff signal, it is meant that such occurrence may take place substantially at the end of such period or signal, or at any time thereafter.

Operation of the FIG. 2 circuit will be explained with the aid of the FIG. 3 waveform chart. The FIG. 3 chart assumes that a prior triggered operation has just taken place, and a vertical line 80 indicates the end of a holdoff period. At this time, a current of 6 milliamperes is immediately provided tunnel diode 68 as indicated at 82 in FIG. 3, and a current of 3 milliamperes is substantially immediately provided to tunnel diode 52 through diode 76 as indicated at 84 in FIG. 3. A further current of 6 milliamperes is supplied to tunnel diode 52 through resistors 60 and 62 as indicated by the slowly rising curve at 86, but the full application of this current is delayed as a result of the time constant of the arming current delay circuit 22, including resistors 60 and 62, and capacitor 64. Now, it is assumed an input is received for providing the aforementioned differentiated signal 57 corresponding substantially to the start of such input. The first occurrence of such input may produce such a differentiated signal 57 superimposed upon the slowly rising portion 86 of the $I_{52}$ current waveform. This signal does not exceed the triggering level 88 which would switch tunnel diode 52 from its low voltage state to its high voltage state. However, after the current of 6 milliamperes through resistors 60 and 62 is fully applied, the next occurrence of differentiated signal 57 exceeds triggering level 88, switching tunnel diode 52 to its high voltage state.

Both tunnel diodes 52 and 68 in the present example require approximately 10 milliamperes to switch the same from a low voltage condition to a high voltage condition. As understood by those skilled in the art, when the proper current is provided, switching takes place very rapidly. In the situation indicated, at the end of a holdoff period, and after the delay produced by arming current delay 22, a total of 9 milliamperes is delivered to tunnel diode 52 for defining a first state thereof wherein the tunnel diode is readily triggerable to a second or high voltage state by application of a one milliampere or greater triggering input pulse, for example. Triggering level 88 indicates the level which must be exceeded before tunnel diode 52 is switched to its high voltage state.

When tunnel diode 52 switches to its high voltage state, the voltage at the cathode of diode 76 is higher than the voltage at the cathode of diode 78, and therefore diode 76 ceases to conduct, as indicated at 90 in FIG. 3, and diode 78 starts conduction as indicated at 92. The current transfer occurs in about a nanosecond. As a result, tunnel diode 68 now receives 9 milliamperes, with 10 or more being required in this example to switch tunnel diode 68 to its high voltage state. A current of 6 milliamperes is still provided tunnel diode 52 through resistors 60 and 62 to keep tunnel diode 52 in its high voltage state, at least until the next holdoff period commences. Thus, tunnel diode 68 by the application of the total of 9 milliamperes in this example is "armed" to a first or triggerable state. Moreover, the current through the tunnel diode defines a definite triggerable condition requiring the triggering pulse of a definite and predetermined magnitude for causing tunnel diode 68 substantially immediately to assume its high voltage state. In the present circuit, this condition or level is fully stabilized before triggering is applied to tunnel diode 68. Triggering is actually applied via delay line 18 having a delay long enough to insure stabilization of the arming current through tunnel diode 68.

The delayed differentiated signals delivered through delay line 18 are illustrated at 94 and 96 in superposition with respect to current $I_{68}$. In FIG. 3 D indicates the delay of delay line 18. When tunnel diode 68 received only 6 milliamperes, the delayed signal 94 had not reached the triggering level 98 for tunnel diode 68. However, as the full 9 milliamperes are applied, delayed differentiated signal 94 exceeds triggering level 98 causing tunnel diode 68 to assume its high voltage state. As tunnel diode 68 assumes its high voltage state, a trigger signal output is produced for triggering a horizontal sweep circuit or the like. Not only does such triggering always occur at a predetermined time relative to the input triggering signal, thereby avoiding jitter, but also triggering occurs with a minimum of time delay after the occurrence of a particular triggering signal because of the rapid switching afforded by the tunnel diodes and steering circuit 28 immediately coupling the tunnel diodes. Therefore, portrayal of the trigger signal is more rapid, and less delay need be included in the oscilloscope's vertical amplifier section.

Figure 4:
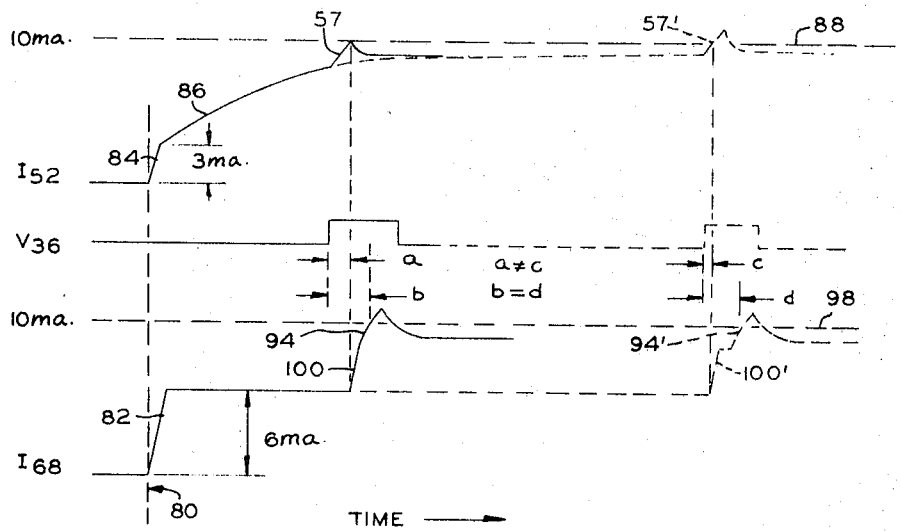
FIG. 4 is a second and more detailed waveform chart illustrating operation of the present invention.

FIG. 4 illustrates the jitter-free advantages of the circuit according to the present invention, showing the waveforms which exemplify two triggering situations. The waveforms are referred to by reference numerals corresponding to those employed in FIG. 3. A first situation is illustrated in full lines, while a second situation is illustrated in dashed lines. In each instance, the square wave output from tunnel diode 36 is shown at $V_{36}$.

In the first instance, shown in full lines, differentiated input 57 superimposed on $I_{52}$ just reaches triggering level 88 to switch current by means of the current steering circuit from tunnel diode 52 to tunnel diode 68. The current in tunnel diode 68 increases to just below triggering level 98. Then, delayed differentiated output 94 is applied to tunnel diode 68, exceeding its triggering level 98, and causing the tunnel diode 68 to switch to its high voltage state for initiating a horizontal sweep. The time period from the beginning of the square wave from tunnel diode 36 to the time at which tunnel diode 68 begins to receive current from diode 78 is designated as $a$. The time period from the beginning of the same square wave to the time at which tunnel diode 68 switches is designated as $b$.

In the second situation shown in dashed lines FIG. 4, the early portion of differentiated input 57 reaches triggering level 88 after a time interval $c$ from the beginning of the occurrence of the square wave produced by tunnel diode 36. At such time, current begins switching from diode 76 to diode 78 as indicated at 100'. Then, after a time interval, $d$, from the beginning of the square wave produced by tunnel diode 36, the delayed differentiated input exceeds triggering level 98 causing the tunnel diode 68 to switch to its high voltage state and initiate a horizontal sweep by sweep generator 24. It is observed that time period $a$ in FIG. 4 is not equal to time period $c$, but time period $b$ and time period $d$ are equal. Time periods $b$ and $d$ correspond to the delay D in FIG. 3, or the delay of delay line 18. Thus, the time of switching of tunnel diode 52 is variable depending upon the time when the holdoff period is concluded in relation to the input signal, and if the output of tunnel diode 52 were employed directly to trigger a sweep generator or the like, jitter could result. However, no triggering arises since the trigger signal output is derived from tunnel diode 68. It is understood that the reception of a triggering signal at the conclusion of the holdoff period is nearly always subject to jitter because the exact time of the occurance of an input triggering signal is unknown by the triggering circuit, and the conclusion of the holdoff signal does not always occur in the same timed relation with respect to the receipt of such input triggering signal.

In the present instance, tunnel diode 52 quickly provides a triggerable condition or level for tunnel diode 68 that is fully stabilized before the delayed triggering signal arrives via delay line 18 to switch tunnel diode 68 and operate sweep generator 24. Therefore, jitter does not occur. In the present circuit additional time delay in further avoidance of jitter is introduced between the holdoff circuit and the tunnel diode 52 by arming current delay circuit 22 so that the initial 6 milliamperes provided tunnel diode 68 through resistor 66 is fully stabilized before 3 milliamperes more current is provided via diode 78. Delay line 18 is arranged to have a delay sufficient for providing the delayed input trigger signal to tunnel diode 68 after a stable level for diode 68 is secured. However, in the circuit according to the present invention, the delay involved is appreciably less than the delay that would be necessary without employment of the steering circuit means.

It is understood that when a holdoff signal again occurs, currents are no longer provided from transistor 58, and tunnel diodes 52 and 68 are reverted to their non-triggered condition.

Another embodiment of the present invention is illustrated in FIG. 5 wherein primed reference numerals refer to elements corresponding to those in FIG. 2. The circuit of FIG. 5 includes a current supply resistor 74' a first end of which is provided current from holdoff circuit 20 at the end of a holdoff period, and the remaining end of which is coupled to the anode of tunnel diode 68'. A current steering resistor 112 is coupled between the anode of tunnel diode 52' and the anode of tunnel diode 68'. Current is supplied tunnel diode 52' at the end of a holdoff period through a time delay circuit comprising resistors 60' and 62' in series with their midpoint shunted to ground by capacitor 64'. The application of this current is thus delayed somewhat relative to the application of current through resistor 74'. Additional current is also provided tunnel diode 68' through the series combination of resistor 66' and variable resistor 118. Variable resistor 118 is here employed to adjust the bias on tunnel diode 68'.

The FIG. 5 circuit receives a triggering input via terminal 102 which is coupled by way of capacitor 104 to the anode of tunnel diode 106. Tunnel diode 106 is provided current from holdoff circuit 20 at the end of a holdoff period through inductance 108. The opposite end of inductance 108 from tunnel diode 106 is returned to ground through load resistor 110. Tunnel diode 106 operates as a free running oscillator, except during the holdoff period, having a first natural frequency, but which is triggered to provide output pulses in synchronism with a triggering input applied at terminal 102. Inductance 108 and load resistor 110 complete the oscillator circuit. It has been found that the inductance 108 is frequently secured by lead inductance alone, so that no actual component part is required. The output at the anode of tunnel diode 106 is applied to the anode of tunnel diode 68' through a differentiating circuit comprising resistor 114 in series with capacitor 116.

At the end of a holdoff period, i.e. when current is supplied tunnel diode 68', pulses from tunnel diode 106 are insufficient in amplitude to switch tunnel diode 68' from a low voltage state to a high voltage state. However, at the conclusion of a holdoff period, sufficient current will be supplied through resistors 60' and 62', with a slight delay, so that tunnel diode 52' is triggered to its high voltage state by a pulse from tunnel diode 106. At this time, a current is caused to flow through resistor 112 which is steered to tunnel diode 68' as a consequence of the higher voltage across tunnel diode 52'. After the additional current is supplied tunnel diode 68', the latter will be armed, and receptive to triggering. A subsequent pulse from tunnel diode 106, will then trigger tunnel diode 68' to its high voltage state and produce a trigger signal output. In the foregoing circuit, variable resistor 118 is adjusted so that tunnel diode 68' is not armed and triggerable until the further current is provided thereto by the steering circuit 28'. The delay in the circuit including resistors 60' and 62', and capacitor 64', permits initial current through resistors 74', 118 and 66' to be stabilized in tunnel diode 68' before additional arming current is diverted thereto by the steering circuit.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A jitter-free triggering circuit comprising:
   means for providing a holdoff signal during a predetermined holdoff period,
   first bistable means for detecting a given triggering input substantially at the conclusion of said holdoff signal,
   second bistable means in which a triggerable condition is established and which initiates a trigger signal output,
   current steering means substantially directly coupling said first bistable means to said second bistable means for initially supplying current to said first bistable means, wherein the detection of said given triggering input by said first bistable means changes the state of said first bistable means and steers current theretofore supplied to said first bistable means to said second bistable means for determining the triggerable condition for said second bistable means,
   delay means for also receiving said triggering input and for delaying the same,
   and means for coupling the triggering input as delayed to said second bistable means, wherein said triggering signal as delayed changes the state of the second bistable means, when the latter is in triggerable condition, for initiating a trigger signal output from said circuit.

2. The circuit according to claim 1 wherein additional current is supplied to said first bistable means at the end of a holdoff period.

3. The circuit according to claim 2 wherein additional current is also supplied to said second bistable means at the end of a holdoff period.

4. The circuit according to claim 2 including time constant means coupled to said first bistable means for delaying the full supply of said additional current thereto.

5. The circuit according to claim 3 further including time constant means coupled to said first bistable means for delaying the full supply of said additional current to said first bistable means at least until such additional current is substantially fully provided to said second bistable means.

6. The circuit according to claim 1 wherein said current steering means is provided current from said means for providing a holdoff signal at the end of a holdoff period thereof.

7. The circuit according to claim 6 wherein said current steering means comprises a pair of diodes receiving current from said means for providing a holdoff signal at the end of a holdoff period thereof, including a diode coupled to said second bistable means which is initially biased so that current is initially delivered to said first bistable means via the other diode before the change of state of said first bistable means.

8. The circuit according to claim 6 wherein said current steering means comprises current supply coupling means for providing current to said bistable means from said means for providing a holdoff signal at the end of a holdoff period, and including means coupling said first bistable means to said second bistable means, wherein sufficient current is steered to the second bistable means for determining the triggerable condition thereof only after said first bistable means changes state to a higher voltage condition in response to said given triggering input so that less current is drawn thereby, in order that greater current is provided said second bistable means.

9. The circuit according to claim 1 wherein each of said bistable means comprises a tunnel diode.

10. A jitter-free triggering circuit comprising:
    means for providing a holdoff signal for a predetermined holdoff period,
    a first negative resistance device to which said holdoff signal is coupled for preventing operation of said first negative resistance device until the conclusion of said predetermined holdoff period,
    means for coupling an input triggering signal to said first negative resistance device for changing the stable state thereof in response to an input triggering signal at the conclusion of said holdoff period,
    a second negative resistance device coupled for providing a trigger signal output,
    current steering means intercoupling said first and second negative resistance devices by means of which a current is initially provided the first device at the conclusion of a holdoff period and wherein said current is steered to the second device when the first device is triggered to a second bistable state, the steered current acting to establish a triggerable condition for said second device,
    delay means for also receiving said input triggering signal and for delaying the same,
    and means for coupling a triggering signal as delayed to said second negative resistance device to change the state thereof and provide a trigger signal output.

11. The circuit according to claim 10 further including means for providing an additional current to said first negative resistance device at the end of said holdoff period, which additional current continues to be supplied for maintaining the changed stable state of said first negative resistance device after the diversion of current by said current steering means.

12. The circuit according to claim 10 wherein said current steering circuit comprises a pair of Schottky barrier diodes receiving current from said means for providing a holdoff signal at the conclusion of said holdoff period;
    and biasing means coupled to said current steering circuit for causing the current from said means for providing a holdoff signal to be first provided to said first negative resistance device until a change of state thereof alters its bias to cause current to flow to the second negative resistance device, thereby establishing a triggerable condition for the second device.

13. The circuit according to claim 12 further including means for providing an additional current from said means for providing a holdoff signal at the end of said holdoff period to both the first and second negative resistance devices, and time constant means coupled to the first such device whereby the additional current rises first in the second device.

14. The circuit according to claim 10 wherein said negative resistance devices each comprise tunnel diodes.

15. The circuit according to claim 10 including a Schmitt circuit coupled to provide said input triggering signal to said first negative resistance device and to said delay means, said Schmitt circuit comprising a third negative resistance device for shaping a triggering input provided thereto.

16. The circuit according to claim 15 wherein said third negative resistance semiconductor device comprises a tunnel diode and further including a semiconductor device having its principal current carrying path coupled across said tunnel diode and biased for conducting lightly when said tunnel diode is in a low voltage state, while conducting more heavily when said tunnel diode is in a high voltage state.

17. A jitter-free triggering circuit comprising:
means for providing a holdoff signal during a predetermined holdoff period,
first bistable means for detecting a given triggering input substantially at the conclusion of said holdoff signal,
second bistable means in which a triggerable condition is established and which initiates a trigger signal output,
currrent steering means substantially directly coupling said first bistable means to said second bistable means for initially supplying a first current to said first bistable means, wherein the detection of said given triggering input by said first bistable means changes the state of said first bistable means and steers current theretofore supplied to said first bistable means to said second bistable means for determining the triggerable condition for said second bistable means.
means for providing additional current to said time constant means with a delay relative to the supply of said first current,
and means for coupling a triggering signal to said second bistable means, wherein said triggering signal changes the state of the second bistable means, when the latter is in triggerable condition, for initiating a trigger signal output.

18. The circuit according to claim 17 including delay means for receiving said triggering input, said triggering signal comprising said given triggering input as delay by said delay means.

19. The circuit according to claim 17 wherein said triggering signal comprises a triggering input subsequent to said given triggering input.

20. The circuit according to claim 17 wherein said current steering circuit comprises current supply coupling means for providing said first current to said devices, and means coupling said devices, wherein a change in state of the first device is characterized by an increase in voltage thereacross causing an increase in current to said second device.

21. The circuit according to claim 20 wherein said first current is supplied from said means for providing a holdoff signal.

22. The circuit according to claim 17 wherein said current steering means comprises a pair of diodes receiving said first current from said means for providing a holdoff signal.

23. The circuit according to claim 21 wherein said additional current is also provided from said means for providing a holdoff signal.

24. The circuit according to claim 22 wherein said additional current is alo provided from said means for providing a holdoff signal.

25. The circuit according to claim 17 including a triggered tunnel diode oscillator coupled to provide said triggering input.

References Cited
UNITED STATES PATENTS

| | | | |
|---|---|---|---|
| 3,215,948 | 11/1965 | Dalton | 328—181 X |
| 3,339,088 | 8/1967 | Dillard | 307—228 X |
| 3,344,285 | 9/1967 | Frye | 307—228 |
| 3,358,159 | 12/1967 | Smith | 307—228 |
| 3,350,576 | 10/1967 | Zimmerman | 307—273 X |

JOHN S. HEYMAN, Primary Examiner

U.S. Cl. X.R.
307—228, 293